United States Patent [19]

Tannahill

[11] Patent Number: 4,930,871
[45] Date of Patent: Jun. 5, 1990

[54] NEEDLE THREADER

[76] Inventor: Bernice B. Tannahill, 4325 Woodlawn, Beaumont, Tex. 77703

[21] Appl. No.: 231,879

[22] Filed: Aug. 15, 1988

[51] Int. Cl.⁵ .................................................. G02B 7/02
[52] U.S. Cl. ..................................... 350/243; 350/245; 223/99
[58] Field of Search ............... 350/243, 242, 244, 245, 350/251, 287; 223/99, 102; 112/222, 225, 302

[56] References Cited

U.S. PATENT DOCUMENTS

| | | | |
|---|---|---|---|
| 242,374 | 5/1881 | Russell. | |
| 1,241,427 | 9/1917 | Nielsen. | |
| 1,278,995 | 9/1918 | Petro. | |
| 1,704,530 | 3/1929 | Buxbaum. | |
| 2,179,834 | 11/1939 | Surbeck | 223/99 |
| 2,544,063 | 3/1951 | Beiderman | 223/99 |
| 2,656,956 | 10/1953 | Kahn | 223/99 |
| 3,022,927 | 2/1962 | Carlsen | 223/99 |
| 3,482,539 | 12/1968 | Bryan | 112/262 |
| 4,147,411 | 4/1979 | Barry | 350/243 |
| 4,720,026 | 1/1988 | Feverman | 223/102 |

*Primary Examiner*—Rodney B. Bovernick
*Assistant Examiner*—Loha Ben
*Attorney, Agent, or Firm*—Guy McClung

[57] ABSTRACT

A needle threader for facilitating the insertion of an end of a thread in the eye of a needle. In one embodiment the threader has a magnifying lens mounted in a holder which is secured to a flexible mount having a ring portion for a person's finger and a wax holder for holding wax to be applied to the end of the thread. In another embodiment such a threader has a colored background contrast member for making it easier to see the thread. This contrast member can be secured to the lens holder or to the flexible mount. In another embodiment a needle threader is provided which has a magnifying lens with a holder and a backgound contrast member. A background contrast member for a magnifying lens is also provided.

9 Claims, 1 Drawing Sheet

NEEDLE THREADER

BACKGROUND OF THE INVENTION

1. Field of the Invention

This invention is directed to needle threaders and parts thereof and, in one embodiment, is directed to a manually manipulable threader and, in another embodiment, is directed to such a threader provided with a background contrast member for facilitating the visual perception of the thread being used.

2. Description of the Prior Art

The prior art discloses a variety of devices directed to needle threading. In accordance with 37 CFR 1.56 the following references are disclosed: (copies submitted herewith):

| U.S. Pat. No. | Subject Matter |
| --- | --- |
| 242,374 | Needle threader with magnifying lens and pin cushion and wax clamps |
| 1,241,427 | Needle threader for scissors with magnifying lens |
| 1,278,995 | Needle threader for scissors with magnifying lens |
| 1,704,530 | Needle threader with ring end for finger |
| 2,179,834 | Air suction needle threader |
| 2,544,063 | Needle threader with needle threading wire loop and a magnifying lens |
| 2,656,956 | Needle threader for holding needle with a threading arm and cams for positioning needle |
| 3,022,927 | Needle threader with thread holding hook for insertion into eye of needle |
| 3,482,539 | Needle threading method with twistable absorbent material for twisting onto thread |
| 4,720,026 | Sewing assembly for working with resistant fabrics |

There has long been an unaddressed need for a needle threader having an easily adjustable and manipulable magnifying lens. There has long been an unaddressed need for a needle threader which facilitates the threading of colored threads which may be difficult to see. There has long been a need for a simple, convenient, easy-to-use needle threader.

SUMMARY OF THE INVENTION

A needle threader according to one embodiment of the present invention has a magnifying lens mounted in a lens mount which is mounted to a flexible member having connected thereto a ring member for encircling a person's finger. The flexible member makes it possible to move the magnifying lens toward and away from a needle held beneath the lens by pushing on or manipulating the lens mount with a finger. In another embodiment of a needle threader according to the present invention a wax holder is provided on the flexible member or the lens mount so that wax is available to help stiffen and straighten the end of a thread prior to insertion of the end into the eye of a needle. In another embodiment of a needle threader according to the present invention a background member is provided which has a colored portion to provide a contrast with a colored thread to make it easier to see and work with the thread. In embodiments of a background color member according to the present invention more than one movable colored background member can be provided or a single background member can itself have more than one colored area. In one embodiment of a needle threader according to the present invention all of the above-described items can be used.

It is, therefore, an object of the present invention to provide a novel, unique, simple, efficient, and nonobvious needle threader and parts thereof.

Another object of this invention is the provision of such a needle threader which has a magnifying lens with a flexible mount so that the location of the lens can be varied, e.g. by manipulating the flexible mount with a finger.

A further object of this invention is the provision of a needle threader having a wax holder for holding wax to straighten and stiffen a thread prior to its insertion into the eye of a needle.

Yet another object of this invention is the provision of a colored background member for a needle threader and of a needle threader with such a member for providing a background which contrasts with a colored thread.

A particular object of this invention is the provision of such a colored background member having areas of different colors or having one or more than one movable colored members.

The present invention recognizes and addresses the previously-mentioned unaddressed long-felt needs and provides a satisfactory meeting of those needs in its various embodiments. To one of skill in this art who has the benefits of this invention's teachings and disclosures, other and further objects and advantages will be clear, as well as others inherent therein, from the following description of presently-preferred emobdiments, given for the purpose of disclosure, when taken in conjunction with the accompanying drawings and photographs. Although these descriptions are detailed to insure adequacy and aid understanding, this is not intended to prejudice that purpose of a patent which is to claim an invention no matter how others may later disguise it by variations in form or additions or further improvements. The claims at the end of this specification are intended as the chief aid toward this purpose.

Figure 1:
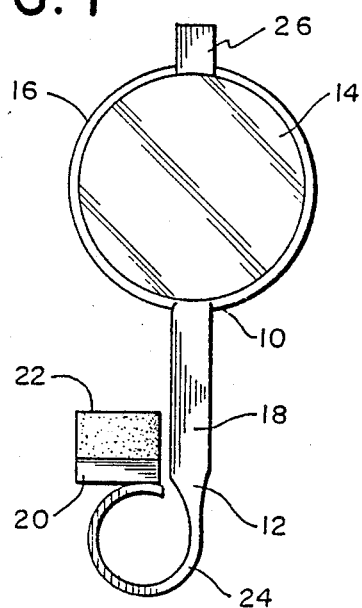
FIG. 1 is a front view of a needle threader according to the present invention.

To facilitate understanding of the present invention three photographs are submitted. Photograph 1 is a side view of an embodiment of a needle threader according to the present invention showing it on a user's hand. Photograph 2 is a front view of the threader of photograph 1 showing the white background disc moved to the side. Photograph 3 shows the disengagement of the background member. Four extra photographs are submitted. Photographs 4,5,6 shows a threaded needle held beneath magnifying lens with needle threader in different positions. Photograph 7 shows perfect position of hand for holding needle threader.

DRAWING LEGEND 10 needle threader
12 flexible mount
14 magnifying lens
16 lens mount
18 lens mount arm
20 wax holder
22 wax
24 ring member
26 lens mount extension
28 recess in 26
30 background contrast member
32 body of 30
34 recess in 32
36 arm
38 colored disc
40 colored disc
42 stud
44 post
46 multi-colored disc
48 colored arm
50 needle
52 thread
54 eye
110 needle threader
130 background contrast member

DESCRIPTION OF PRESENTLY-PREFERRED EMBODIMENTS

Referring to FIG. 1, a needle threader 10 according to the present invention has a magnifying lens 14 mounted in a lens mount 16 (lens mount 16 is shown as having a circular shape; of course, it can be any suitable shape) with an extending lens mount arm 18. The lens mount arm 18 is secured to a flexible mount 12 which has a wax holder 20 connected thereto in which is a quantity of wax 22. By pressing on, pulling, or manipulating the flexible mount 12 the position of the lens 14 can be slightly varied to assist in viewing an object such as thread disposed behind the lens 14. The wax 22 can be used to stiffen and straighten an end of a thread to be inserted in a needle with the aid of the needle threader 10. The ring member 24 is disposed so that a person's finger can easily be inserted in it.

Figure 2:
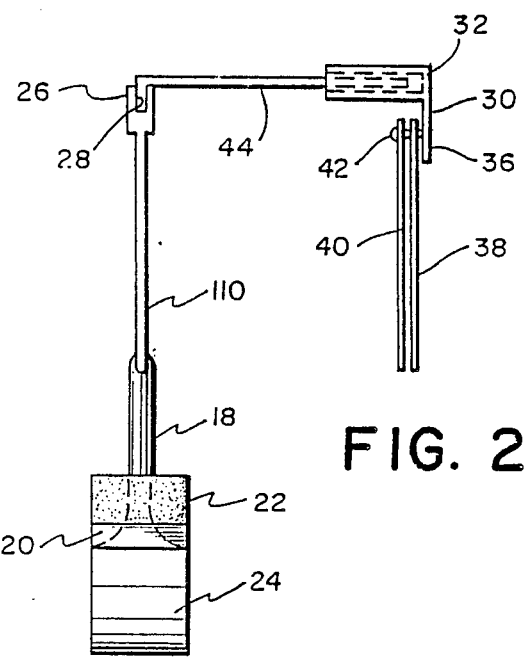
FIG. 2 is a side view of a needle threader according to the present invention.
Figure 3:
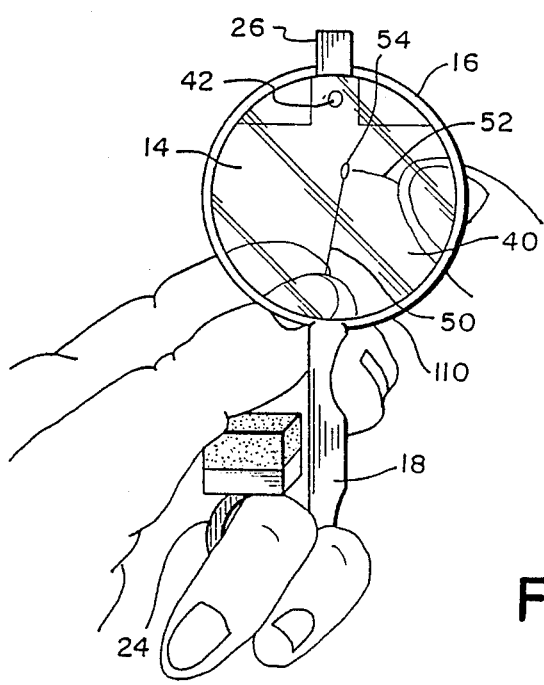
FIG. 3 is a front view showing the use of the threader of FIG. 2.

As shown in FIG. 2 another embodiment of a needle threader 110 according to the present invention has some elements like the threader 10 of FIG. 1. The threader 110 has a background contrast member 30 which is connected to and spaced apart from the lens mount 16 by a post 44 which extends between a recess 28 in a lens mount extension 26 and a recess 34 in a body 32 of the background contrast member 30 (see FIG. 4). The post 44 can be fashioned so that its ends are held firmly yet removably in the recesses 28, 34 so that the background contrast member 30 can be detachably connected to the lens mount 16. It is within the scope of this invention to secure or connect the background contrast member to the lens mount arm 18 or to the flexible mount 12.

Figure 5:
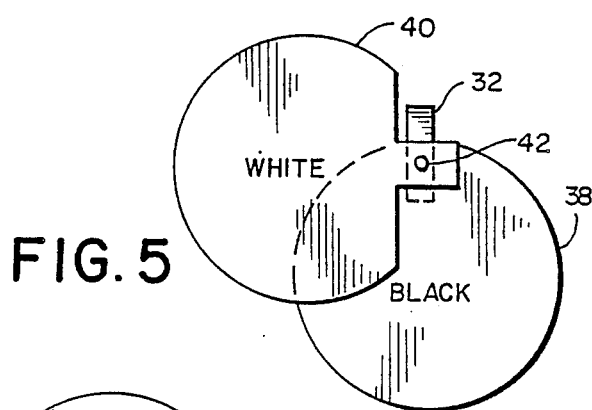
FIG. 5 is a front view of the threader background member shown in FIG. 2.
Figure 6:
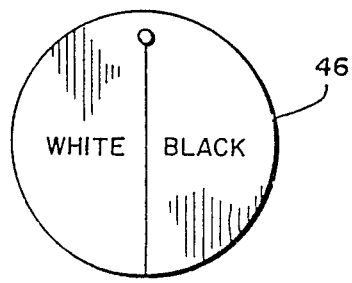
FIG. 6 is a front view of a multi-colored background disc according to the present invention.

In the background contrast member 30 shown in FIG. 2, there is a downwardly extending arm 36 connected to the body 32 to which two colored discs 38 and 40 are movably connected by a stud 42. As shown in FIG. 5, the disc 38 is colored black and the disc 40 is colored white so that, depending on the color of the thread to be inserted in a needle, a background can be chosen which will contrast with the thread thereby making it easier to see and work with the thread. For example, if a white or light colored thread is used, the white disc 40 can be moved out of the way so that a black background is presented. This is also illustrated in Photograph 2. As shown in FIG. 6 a single colored disc 46 according to this invention may have multiple areas of different color. It should be clear that any practical number of discs of any desired colors or multiple color areas may be employed without departing from the spirit and scope of the invention.

Figure 4:
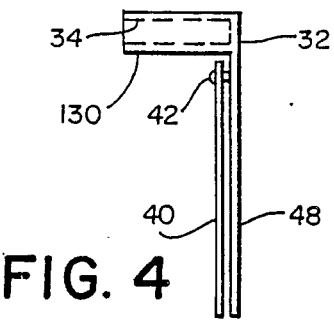
FIG. 4 is a side view of a threader background member according to the present invention.

In the background contrast member 130 shown in FIG. 4, an extended arm 48 extends from the body 32 and has movably connected to it by stud 42 a colored disc 40.

As shown in FIG. 6 and Photographs 1 and 2 a needle threader according to this invention, such as threader 110, can easily and conveniently be enplaced on and held by a person's hand with one finger through the ring member 24 and another finger touching the flexible mount 12 while a thumb and another finger hold the lens mount arm 18 and a needle 50 (behind the lens 14). A thread 52 is to be inserted into an eye 54 of the needle 50. It is preferred that a person's third finger be slipped into the ring member 24 and pushed between the finger's first and second joint and that the needle be placed between the thumb and forefinger. The middle finger is placed against the lens mount arm 18 to direct and steady movement. The little finger can assist the third finger in steadying movement.

Photograph 3 illustrates the detachability of the background contrast member from the lens mount extension 26 of the lens mount 16.

In conclusion, therefore, it is seen that the present invention and the embodiments disclosed herein are well adapted to carry out the objectives and obtain the ends set forth at the outset as well as others inherent therein. It is intended that the appended claims be understood as referring to all equivalent elements of the recited elements and all equivalent combinations of the recited combinations which accomplish substantially the same results in substantially the same manner.

I claim as my invention:

1. A needle threader for facilitating the insertion of an end of thread in an eye of a needle, the needle threader comprising:

a magnifying lens, holder,
   a magnifying lens held by the magnifying lens holder,
   a flexible mount, the magnifying lens holder being secured to the flexible mount,
   a ring member secured to the flexible mount suitable for receiving and holding a person's finger, and
   a wax holder secured to the ring member or to the flexible mount for holding wax for stiffening and straightening the end of the thread.

2. The needle threader of claim 1, further comprising a background contrast member secured to the lens holder or to the flexible mount and spaced apart therefrom,
   the background contrast member having at least one colored area for making it easier to see a thread placed beneath the magnifying lens between the lens and the background contrast member.

3. The needle threader of claim 2, wherein the background contrast member is detachably connected to the lens holder or to the flexible mount.

4. The needle threader of claim 2 further comprising at least one colored disc movably mounted to the background contrast member,
said at least one colored disc being movable so that a background of a selected color can be employed.

5. The needle threader of claim 4, wherein said at least one colored disc has two or more areas of different colors.

6. A needle threader for facilitating the insertion of an end of a thread in an eye of a needle, the needle threader comprising:
a magnifying lens holder,
a magnifying lens held by the magnifying lens holder, and
a background contrast member connected to the lens holder and spaced apart therefrom,
the background contrast member having at least one colored area for making it easier to see a thread placed between the magnifying lens and the background contrast member.

7. The needle threader of claim 6, wherein the background contrast member is detachably connected to the magnifying lens holder.

8. The needle threader of claim 6, further comprising at least one colored disc movably mounted to the background contrast member,
said at least one colored disc being movable so that a background of a selected color can be employed.

9. The needle threader of claim 8, wherein said at least one colored disc has two or more areas of different colors.

* * * * *